United States Patent
Gazier et al.

(10) Patent No.: US 7,477,663 B2
(45) Date of Patent: Jan. 13, 2009

(54) HIGH LAYER BONDING OF MULTIPLE ACCESS LINES FOR CARRIER GRADE ACCESS

(75) Inventors: Michael Gazier, Nepean (CA); Morteza Ghodrat, Kanata (CA)

(73) Assignee: Ciena Corporation, Linthicum, MD (US)

( * ) Notice: Subject to any disclaimer, the term of this patent is extended or adjusted under 35 U.S.C. 154(b) by 940 days.

(21) Appl. No.: 10/440,028

(22) Filed: May 15, 2003

(65) Prior Publication Data

US 2004/0022276 A1 Feb. 5, 2004

(30) Foreign Application Priority Data

May 15, 2002 (CA) .................................... 2386453

(51) Int. Cl.
*H04J 3/04* (2006.01)
(52) U.S. Cl. .................... 370/535; 370/463; 370/395.1; 375/222; 709/220
(58) Field of Classification Search ............... 370/395.3, 370/535, 537, 286, 395.1, 463; 375/222; 709/220
See application file for complete search history.

(56) References Cited

U.S. PATENT DOCUMENTS

| | | | |
|---|---|---|---|
| 5,400,324 A | 3/1995 | Eriksson | |
| 5,748,614 A | 5/1998 | Wallmeier | |
| 6,084,881 A | 7/2000 | Fosmark et al. | |
| 6,134,246 A | 10/2000 | Cai et al. | |
| 6,222,858 B1 | 4/2001 | Counterman | |
| 6,535,513 B1* | 3/2003 | Kao et al. | 370/395.1 |
| 6,693,911 B2* | 2/2004 | Yamanaka | 370/395.3 |
| 7,023,910 B1* | 4/2006 | Norrell | 375/222 |
| 2003/0091053 A1* | 5/2003 | Tzannes et al. | 370/395.1 |

* cited by examiner

*Primary Examiner*—Gerald Gauthier
(74) *Attorney, Agent, or Firm*—Merek, Blackmon & Voorhees, LLC

(57) ABSTRACT

Apparatus and method that increases bandwidth and reliability of digital subscriber line (DSL) connections. The system involves provisioning multiple DSL lines, splitting traffic into cells, transmitting the cells independently of each other, and reassembling the cells at the destination. Sequence numbers may be used when reassembling the cells. Virtual circuits (VCs) may be constructed across the DSL lines. Accordingly, a failure in one DSL line merely reduces the bandwidth without disruption to the customer. In this manner, the customer can be inexpensively provided with increased bandwidth and reliability.

31 Claims, 3 Drawing Sheets

HIGH LAYER BONDING OF MULTIPLE ACCESS LINES FOR CARRIER GRADE ACCESS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates generally to Digital Subscriber Loop (DSL) technology, and specifically to a system and method for effectively providing an increased bandwidth and increased reliability.

One proposal for high-speed communication is the introduction of Digital Subscriber Line (DSL) technology. Currently, there many different DSL standards, including Asymmetric DSL (ADSL), High-speed DSL (HDSL), Very High Speed DSL (VDSL), Symmetric DSL (SDSL), Symmetric, High-speed DSL (SHDSL), Integrated Services Digital Network (ISDN) DSL (IDSL) systems, and the like. Generically, the term DSL is used to represent these, and other, standards. One of the most attractive features of DSL is that it is implemented using an infrastructure that already exists, namely the Plain Old Telephone System (POTS). DSL shares copper twisted pair lines typically used for telephone communication.

However, there are still several issues with DSL technology. A first issue is the lack of protection of DSL line cards due to cost implications, and due to the fact that a single or low number of customer(s) may be impacted. For example, failure of a DSL line caused by a cut wire results in loss of service only to the customer serviced by the line. To overcome this protection limitation, carriers often include a redundant DSL line in their offering to businesses or other customers demanding carrier-grade service. However, from an end-user perspective, this type of fail-over recovery mechanisms may not be economically viable. This expense results because the redundant DSL line carries no additional bandwidth. Additionally, the customer may need to add router(s) to their network, which complicates the provisioning and adds cost to the operations of the network. Yet further, the recovery from a defective line to the redundant, back-up line may also be slow.

A second issue with DSL technology is bandwidth limitation. DSL has a known rate/reach limitation. Generally, a longer line obtains a lower bandwidth service than a shorter line. Also, a poor quality line, for example a bad cable or a line with taps, will obtain a lower bandwidth service than a high quality line. Such line impairments limit the ability of a carrier to offer services having high bandwidth requirements, for example video.

Higher speed, layer-1 solutions, such as VDSL instead of ADSL, attempt to address the bandwidth problem but may suffer from a high initial deployment cost. Typically, VDSL line cards are more expensive, less dense, and have worse rate/reach limitations than ADSL. Additionally, fixing the physical line to the customer by removing taps and/or bridges on the line may improve the bandwidth available on the line, but a service call of this nature is very expensive, and the required bandwidth may still not be achieved.

To address the above issues, a number of solutions are currently proposed by the industry. A "layer 1" solution can be provided to address the bonding of two lines. Bonding at layer 1 ties two or more lines together at the physical layer. A simple example is bitwise or bytewise multiplexing of the bits or bytes from two or more lines together. An example of layer 1 bonding is given in the BONDING specification from Integrated Services Digital Network (ISDN).

A layer 1 solution is elegant because it hides the plurality of lines from upper layers. However, it tends to be inflexible in parameters like different link lengths, delay between lines, and different link rates. Also, bonding tends to be implemented on one chip, or one circuit card (line card), due to the tight coupling of the lines bonded together. Thus, a layer 1 solution does not address the issue of line card failure. Further, it typically cannot address the bonding of more lines than fit on one chip or one line card, nor does it address lines that are operating at different rates.

A "layer 2" solution can be implemented instead of, or in addition to, the layer 1 solution. An example of a layer 2 solution for Asynchronous Transfer Mode (ATM) is Index Multiplexing over ATM (IMA). IMA bundles multiple physical links to create a bigger virtual link. However, IMA requires underlying physical links to be of the same speed, or bandwidth, which limits the granularity of the service offerings. That is, as applied to DSL, every DSL line must be of equal speed.

Another example of a layer 2 solution is a Point-to-Point Protocol (PPP) solution. In the PPP solution, multi-line PPP (MP) can bond lines together. RFC 1717, written in 1994, defines Multilink PPP, which is now used in virtually all modem ISDN equipment. It was later replaced by RFC 1990. Multilink PPP allows ISDN devices to bond two 64K channels into a logical 128K channel. This solution is effective because it can bond together lines of different rates and delays. However, it relies on data being on top of PPP. Many protocols do not support PPP, which limits the scope of application of such a solution.

Yet a further solution is to implement a "layer 3" solution, such as routing data across two or more DSL lines to the same customer. While this solution does a good job for load balancing across multiple flows, it cannot split a single traffic flow across multiple links. That is, a largest flow supported by this solution depends on the bandwidth of the largest DSL links. Additionally this solution can suffer from the following issues. It is expensive due to two ADSL routers, two gateway devices, and an additional service provider supplied router. Layer 3 recovery can be slow. Multiple layer 3 routes can cause network confusion. Multiple layer 3 routes can cause return path route asymmetry.

Thus it can be seen that the current solutions are effective for either addressing issues of protecting a DSL line or reducing bandwidth limitations, but not both. Furthermore, the current solutions may be impractical, expensive or complicated. Thus, it is an object of the present invention to obviate or mitigate at least some of the above-mentioned disadvantages.

BRIEF SUMMARY OF THE INVENTION

It is an advantage of the present invention that multiple DSL lines can be bound together to create a data-path having a larger bandwidth than would be possible using a single DSL line, without the protection and bandwidth limitations of the prior art.

In accordance with an aspect of the present invention, there is provided a multiplexing system for use with a digital subscriber loop (DSL) communication system including at least one DSL link and a switching fabric. The multiplexing system comprises a first end point for receiving a stream of data cells and multiplexing the data cells onto a plurality of virtual circuits (VCs). The multiplexed data cells include a sequence number for identifying an offset from a predefined cell. The multiplexing system further comprises a second end point for receiving and demultiplexing data cells from the plurality of virtual circuits via the DSL communication system. The second end point organizes the received data cells in accordance with the cell's sequence number and outputs the organized cells in an output data stream.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
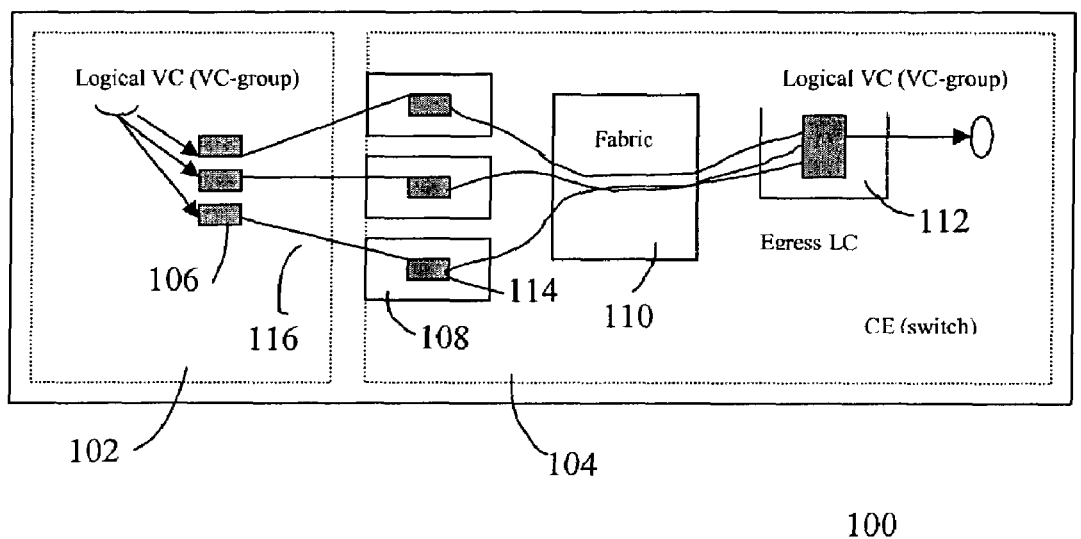
FIG. 1 is a block diagram if a DSL system in accordance with an embodiment of the present invention.

For convenience, like numerals in the description refer to like structures in the drawings. Referring to FIG. 1, a DSL system in accordance with an embodiment of the present invention is illustrated generally by numeral 100. The system 100 includes customer premises equipment (CPE) 102 and a common element (CE) 104. The CPE 102 includes a plurality of remote ADSL transceiver units (ATU-Rs) 106. The common element includes a plurality of line cards 108, a switching fabric 110, and an end point 112. The line cards 108 further include central ADSL transceiver units (ATU-Cs) 114. Each of the ATU-Rs is coupled to an associated ATU-C via a DSL link 116. Although the figure illustrates only a single CPE 102, it will be appreciated by a person skilled in the art that multiple CPE may be used for a single customer. Each CPE would preferably be connected to a different line card for providing increased reliability. The general operation of the components of the system is known in the art and thus only the modifications in accordance with the present embodiment will be described in detail.

The system 100 is used for binding multiple DSL lines together to create a data-path having a larger bandwidth than would be possible using a single DSL line. However, the data-path is created such that it addresses both the protection and bandwidth limitations of ADSL, as discussed with regard to the prior art.

In the present embodiment, a subscriber is assigned a plurality of intermediate ATM virtual circuits (VCs). The intermediate VCs assigned to a subscriber, hereinafter referred to as a VC group, are used to create a single, larger, logical VC, thus providing the subscriber with bandwidth that may exceed bandwidth available over a single line. Each of the VCs in the VC group is then independently routed across multiple paths in the network and regrouped into the original VC once the binding region has been traversed.

Figure 2:
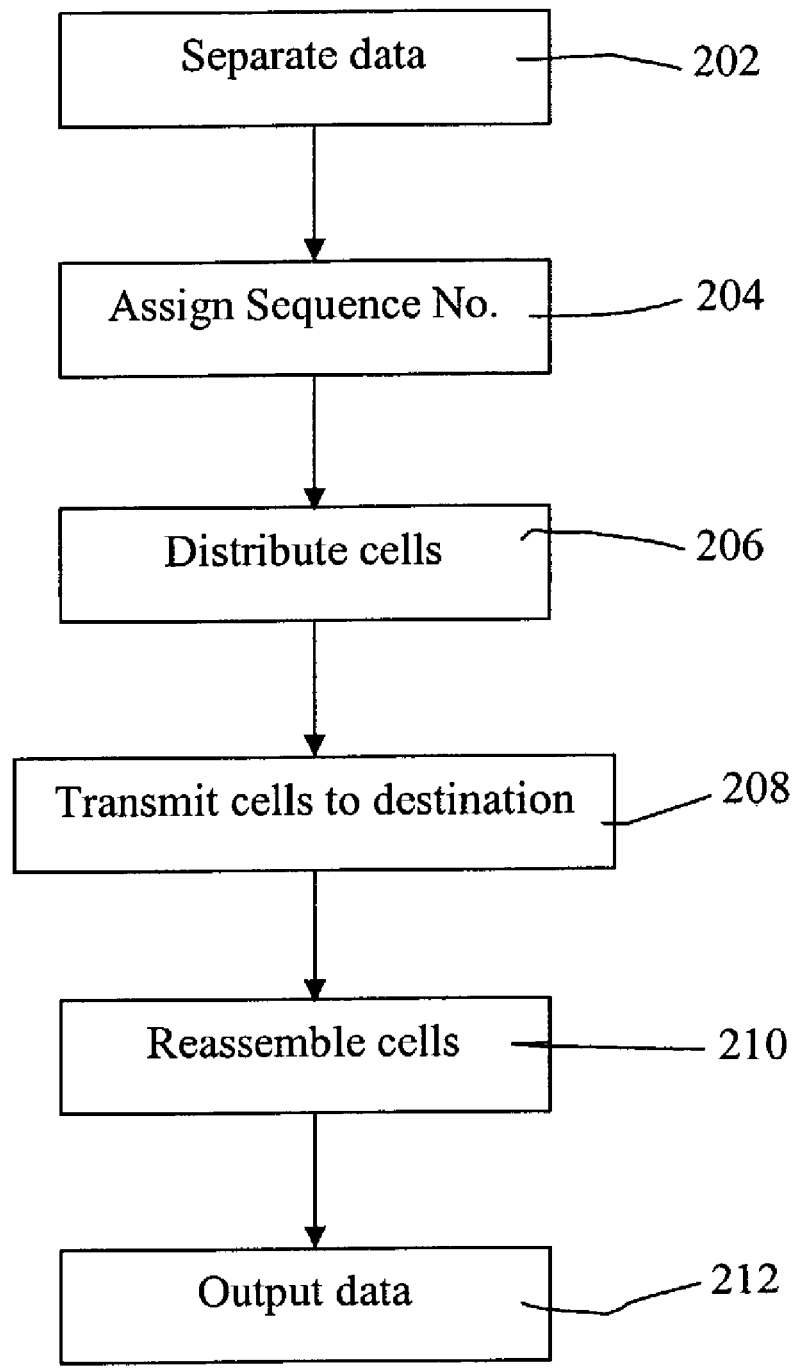
FIG. 2 is a flowchart illustrating the operation of the DSL system represented in FIG. 1 in the upstream direction.

Referring to FIG. 2, a flowchart illustrating operation of the network 100 in the upstream direction, that is, from the ATU-R 106 to the ATU-C 114, is illustrated generally by numeral 200. At step 202, traffic at the CPE 102 is split at cell boundaries for distribution across multiple VCs. The CPE 102 receives an outgoing subscriber message and separates the message into individual cells. At step 204, each of the cells is assigned a sequence number to indicate its relative position to, or offset from, a lead cell. At step 206, the cells are then multiplexed across the plurality of VCs comprising the VC group. Each of the VCs is associated with an ATU-R 106. Preferably, the VCs are instantiated such that their bandwidth is only a portion of the bandwidth available on a single DSL line. Thus, multiple VCs can be associated with each ATU-R 106. Alternately, the bandwidth of each VC is equivalent to the bandwidth on the DSL line 116 and one VC is associated with each ATU-R 106.

Each VC is treated as independent VCs in a standard DSL system and in step 208 the data is transmitted to its destination as follows. The data for each VC is transmitted from the ATU-R 106 to the ATU-C 114 via the DSL link 116. The ATU-C 114 transmits the data for each VC across the switching fabric 110 to its destination, or end point. Each VC is routed independently of the other VCs and thus will likely traverse different routes through the switching fabric 110. Thus, at intermediate switching points in the switching fabric 110, cells are simply forwarded as is typical for an ATM switch. In step 210, at the end point of the CE, the cells are buffered as required in order to rebuild the original cell sequence in accordance with the sequence number of each cell. The end point is typically an egress line card 112, but it may be another convenient location, as will be appreciated by a person or ordinary skill in the art. Also, the plurality of VCs will likely have different values for their virtual path identifier (VPI) and virtual channel identifier (VCI) to the VPI/VCI for the traffic originally sent to the CPE 102. Thus, the original VPI/VCI is reapplied and header or other required checksums are regenerated. The original VPI/VCI is known at endpoint using one of a plurality of possible mechanisms. In a first example, the original VPI/VCI is provisioned at the end point. In a second example, the original VPI/VCI is communicated to the endpoint via signaling. At step 212, the data is output at a rate approximately equivalent to the combined rate of the VC group.

Figure 3:
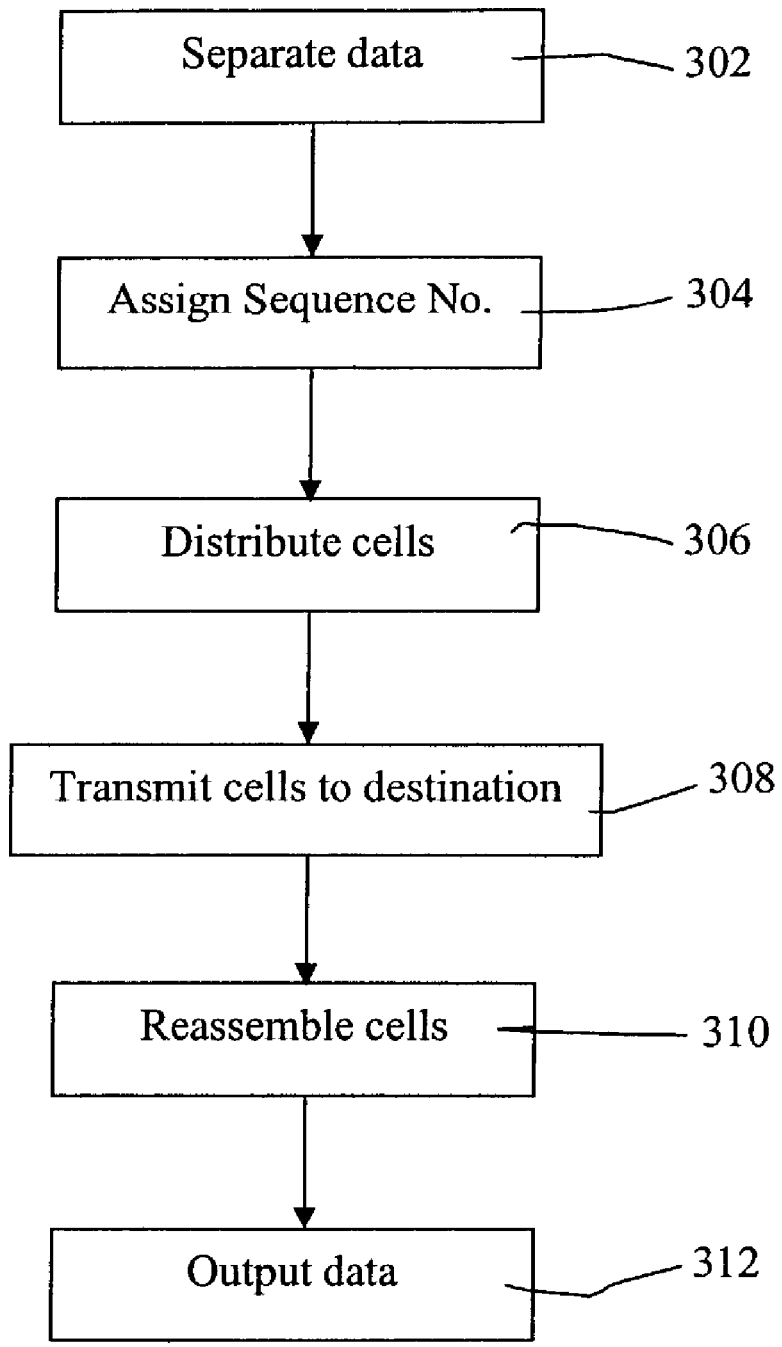
FIG. 3 is a flowchart illustrating the operation of the DSL system represented in FIG. 1 in the downstream direction.

Referring to FIG. 3, a flowchart illustrating operation of the network 100 in the downstream direction, that is, from the ATU-C 114 to the ATU-R 106 is illustrated generally by numeral 300. The flowchart is similar to the flowchart illustrated in FIG. 2 in reverse order. At step 302, cells at the end point are separated along the cell line. If the end point in the upstream direction is an egress line card 112, then in the downstream direction, that same line card 112 may be used as an incoming line card. At step 304, the end point inserts sequence numbers into the cells and, at step 306, and the cells are scheduled to a plurality of VCs in the VC group. At step 308, the cells are distributed to the ATU-Cs 114 via the switching network. The CE 104 splits the traffic over the DSL links using the VCs and typical ATM switching. At step 310, the CPE 102 reassembles the cells into the logical VC in accordance with their sequence numbers. At step 312, the CPE 102 delivers the combined data stream to higher-level applications.

A detailed description of VC splitting and scheduling as well as applying the sequence numbers is provided as follows. In one embodiment; splitting the traffic into multiple VCs is based on the peak cell rate (PCR) of each VC. In a simple form, all VCs have identical PCR and the cells are scheduled to each VC in a round robin fashion using a scheduler. Schedulers are known in the art and need not be discussed in detail. However, the scheduler should be made flexible to allow traffic be distributed across VCs with different PCRs. For example, if a first VC has a PCR twice the size of a second VC, then it is preferable that the scheduler distributes twice as many cells to the first VC as it does to the second VC.

For each cell, the sequence number can be carried in the header, the VPI/VCI fields, or in the payload. If the payload is used to carry the sequence number then the following a sequence number position in the payload is proposed. For example, a last byte of the payload is assigned as the sequence number. In this example, when data is packed into the ATM cells at a transmitter, 47 bytes of data and one byte of sequence number are included in the payload of the cell. When data is unpacked from cells at a receiver, bytes from a following cell are used to complete each payload. That is, each cell waits for a subsequent cell to arrive, providing two cells in a buffer, before being recombined into a single VC. Bytes occupied by the sequence number are replaced by data in the subsequent cell. A first received cell, having a sequence number of one, uses one byte of data from the payload of a subsequent cell to replace the sequence number once it has been removed. A second cell, having a sequence number of two, uses two bytes of data from the payload of a subsequent cell to replace the sequence number and the byte transferred to the previous cell. Thus, it can be seen that the number of bytes taken from the subsequent cell is equivalent to the sequence number of the cell. Alternately, another allocated number of bits of the payload is assigned as the sequence number.

If the VPI/VCI fields are used to carry the sequence number then the following options could be used. In one embodiment, the VPI/VCI fields are partitioned statically. That is, the most significant predefined number of bits (MSB) of the VCI field carries the VCI value and the least significant predefined number of bits (LSB) carries the sequence number. In the present embodiment, the preferred value of the predefined number of bits is eight. The value eight is selected in the present embodiment, since an eight-bit sequence number is sufficient for identifying 256 cells, which is greater than the maximum packet size currently supported by ATM. A person skilled in the art will appreciate that the maximum size of the sequence bit can vary as required without detracting from the scope of the invention.

Similarly, if VPI field is used to carry the sequence number, the MSB of the VPI field carries the VPI value and the remaining bits carry the sequence number. In the present embodiment, the preferred value for the predefined number of bits is four. Thus, it will be appreciated that it is preferable to use the VCI field for carrying the sequence number instead of the VPI field. This is true unless the packet is relatively short and can be separated into cells that can each be uniquely identified using a four-bit sequence number. Further, combinations of the above may also be useful as will be apparent to a person skilled in the art. The decision as to where the sequence number is carried is typically made at the connection setup and communicated either by signaling or manual configuration. Alternately, it may eventually be designated by a given standard.

In an alternate embodiment, VPI/VCI fields are partitioned flexibly, or dynamically. That is, the VPI/VCI fields are associated with VPI-mask and VCI-mask fields. Each VC is configured, or signaled, with two sets of masks, a VPI-mask and VCI-mask. The size of the mask is determined in accordance with the number of bits assigned to the sequence number. For example, if the sequence number is eight bits wide, the mask will be eight bits wide. Intermediate switches in the switching fabric use the mask to hide the sequence number from the routing mechanism. Thus, incoming cells are routed in accordance with the unmasked data in the VPI and VCI field, rather than the entire VPI or VCI field. For example, a VC is configured with an eight-bit VCI-mask for masking the eight LSB of the VCI field. The intermediate switches will only examine the eight MSB of the VCI field as opposed to the entire 16 bits. Similarly, the VPI-mask is used to mask the VPI field. The two end points of each VC use both the masked and unmasked bits in the VPI/VCI fields for organizing and routing the data. Various combinations of the above may be found to be useful, as will be apparent to a person skilled in the art.

In yet an alternate embodiment, instead of using a sequence number to maintain order, the system inserts marker cells into each VC at predefined intervals. Thus, the end point can determine the transmission rate of each VC in the group by calculating the frequency at which the marker cells are received. The end point can then retrieve cells from each VC in accordance with its transmission rate. For example, if it is determined that a first VC has twice the transmission rate of a second VC, two cells are retrieved from the first VC for each cell that is retrieved from the second VC. The retrieved cells are then combined to form the logical VC. Further, the marker cells can also be used for verifying the alignment for the combining process using linear interpolation or other methods that will be apparent to a person skilled in the art.

The present invention provides several advantages to a subscriber. A first advantage is that the subscriber has multiple VCs as opposed to a single VC. This fact allows the subscriber to obtain a larger bandwidth simply by bounding additional VCs to the currently allotted ones. This includes the addition of VCs on existing DSL links as well as the addition of further DSL links for carrying more VCs. As a result, the subscriber can avoid down time, which may be required to tear down an existing VC and set up a new, larger VC.

A second advantage is that the subscriber may want to route two VCs across a network for reliability purposes. That is, failure of one VC leads to use of another VC. Even though full rate service may not be available, at least a minimal service is available to the subscriber as will be appreciated by a person skilled in the art. For example, if one of the DSL lines fails, the VCs transported by that DSL line would be unavailable. However, the VCs on the remaining DSL lines will be available and the communication link can be maintained.

Although the above description refers to transporting a plurality of VCs over a plurality of DSL links, it is also possible that a plurality of VCs is transported over a single DSL link. Such an embodiment is unable to obtain all of the benefits of the preferred embodiment. For example, if the DSL link is cut, there is no alternate path since all VCs are transported over the same link. Further, the bandwidth available is limited by a single DSL link. However, the system would still benefit from independent routing of the multiple VCs in the switching fabric. Thus, if there is a problem in the switching fabric, it is likely that at least one of the VCs will remain intact.

It should be noted, however, that the above described solution is well optimized for data services where a delay is generally more tolerated. In the present example, the delay is caused by buffering two consecutive cells at the egress point. The UBR, UBR+, VBR nrt, and GFR standards are good candidates for the system described herein. However, CBR and VBR rt connections should use the system only when delay is acceptable.

Although the invention has been described with reference to certain specific embodiments, various modifications thereof will be apparent to those skilled in the art without departing from the spirit and scope of the invention as outlined in the claims appended hereto.

What is claimed is:

1. A multiplexing system for use with a digital subscriber loop (DSL) communication system including at least two parallel DSL links and a switching fabric, said multiplexing system comprising:
   a) a first end point at a consumer premise for receiving a stream of data cells and multiplexing said data cells onto a plurality of virtual circuits (VCs), each of said VCs capable of being independently routed across said switching fabric, wherein said consumer premise includes two parallel DSL links connected to said first end point and said switching fabric for transmitting said multiplexed data cells in parallel from said first end point at said consumer premise over said two parallel DSL links to said switching fabric; and
   b) a second end point for receiving and demultiplexing said data cells from said plurality of virtual circuits via said two parallel DSL links, said second end point for organizing said data cells after receipt and outputting said data cells after organization in an output data stream.

2. A system as defined in claim 1, wherein said data cells after being multiplexed each include a sequence number for identifying an offset from a predefined cell, and said second end point organizes said data cells after receipt in accordance with a respective sequence number of each of said data cells.

3. A system as defined in claim 2, wherein said first end point further includes a scheduler for multiplexing said data cells.

4. A system as defined in claim 3, wherein said scheduler assigns said data cells to said plurality of VCs in accordance with an available bandwidth on each of said plurality of VCs.

5. A system as defined in claim 4, wherein said scheduler assigns said data cells to said plurality of VCs in accordance with a peak cell rate on each of said plurality of VCs.

6. A system as defined in claim 2, wherein said sequence number is imbedded into a payload of each of said data cells.

7. A system as defined in claim 6, wherein said sequence number occupies a predefined portion of said payload.

8. A system as defined in claim 2, wherein said sequence number is imbedded into a predefined portion of a virtual channel identifier (VCI) of each of said data cells.

9. A system as defined in claim 2, wherein said sequence number is imbedded into a predefined portion of a virtual path identifier (VPI) of each of said data cells.

10. A system as defined in claim 2, wherein said sequence number is dynamically imbedded into at least one of a VPI and a VCI of each of said data cells, and a corresponding masking signal is provided for enabling intermediate switches in said switching fabric to ignore said sequence number when routing each of said data cells.

11. A system as defined in claim 10, wherein said second end point uses said masking signal for identifying said sequence number.

12. A system as defined in claim 1, wherein each of said DSL links is a Plain Old Telephone System (POTS) line terminating at said consumer premise first end point.

13. A system as defined in claim 1, where more than two DSL links couple said first and second end points.

14. A system as defined in claim 13, wherein said plurality of VCs is carried over each of said plurality of DSL links.

15. A system as defined in claim 13, wherein a respective single VC is carried over each of said plurality of DSL links.

16. A system as defined in claim 1, wherein said first end point further includes a scheduler for multiplexing said data cells and said second end point further includes:
   a) a transmission rate detector for detecting a transmission rate of each of said plurality of VCs; and
   b) a scheduler for demultiplexing each of said plurality of VCs in accordance with an associated detected transmission rate.

17. A system as defined in claim 1, where a plurality of DSL links couple said first and second end points in parallel.

18. A system as defined in claim 17, wherein said plurality of VCs is carried over each of said plurality of DSL links.

19. A system as defined in claim 1, wherein each said VC is capable of beign independently routed across said two parallel DSL links and across said switching fabric.

20. A method of multiplexing data over a digital subscriber loop (DSL) communication system including at least one DSL link and a switching fabric, said method comprising the steps of:
   organizing said data in cells;
   distributing said cells across a plurality of virtual circuits (VCs);
   transmitting said cells over said at least one DSL link to a destination across each of said plurality of VCs, each of said plurality of VCs being switched across said switching fabric independently;
   reassembling said cells at said destination for recovering said data; and
   outputting said data at a rate greater than that of any single one of said plurality of VCs.

21. A method as defined in claim 20, further including:
   inserting a sequence number into each of said cells before transmitting said cells to said destination.

22. A method as defined in claim 21, wherein said step of reassembling said cells includes organizing said cells in accordance with a respective sequence number of each of said cells.

23. A method as defined in claim 22, wherein said sequence number is included in a header of each of said cells.

24. A method as defined in claim 23, wherein said sequence number is included in a Virtual Path Identifier field of said header.

25. A method as defined in claim 23, wherein said sequence number is included in a Virtual Channel Identifier field of said header.

26. A method as defined in claim 22, wherein said sequence number is included in a payload of each of said cells.

27. A method as defined in claim 20, further including:
   inserting a marker cell in each of said plurality of VCs at predetermined intervals such that a transmission rate of each of said plurality of VCs can be determined at said destination.

28. A method as defined in claim 27, wherein said step of reassembling said cells includes organizing said cells in accordance with a respective transmission rate of each of said plurality of VCs.

29. A method of claim 20, further comprising:
   providing a consumer premise with at least two DSL links connected to a first end point;
   receiving a stream of data at said first end point for multiplexing;
   multiplexing said data prior to distributing said cells;
   transmitting said cells over at least two parallel DSL links from said first end point to said destination.

30. A method of claim 29, wherein when one of said at least two parallel DSL links fails, said VCs are automatically switched to another of said at least two parallel DSL links.

31. A multiplexing system for use with a digital subscriber loop (DSL) communication system including at least one DSL link and a switching fabric, said multiplexing system comprising:

a) a first end point at a consumer premise for receiving a stream of data cells and multiplexing said data cells onto a plurality of virtual circuits (VCs), each of which VC capable of being independently routed across said switching fabric; and b) a second end point for receiving said multiplexed data cells over said plurality of virtual circuits from said DSL link and demultiplexing said data cells from said plurality of virtual circuits via said DSL communication system, said second end point for organizing said data cells after receipt and outputting said data cells after organization in an output data stream; wherein at least two parallel DSL links connect said first end point for carrying said multiplexed data cells in parallel over said two parallel DSL links to switching fabric.

* * * * *